(12) United States Patent
Liu et al.

(10) Patent No.: US 11,259,349 B1
(45) Date of Patent: Feb. 22, 2022

(54) AUDIO-VISUAL TRANSMISSION DEVICE

(71) Applicant: Magic Control Technology Corporation, New Taipei (TW)

(72) Inventors: Yi-Ching Liu, New Taipei (TW); Min-Chieh Tsai, New Taipei (TW); Ming-Te Chang, New Taipei (TW)

(73) Assignee: Magic Control Technology Corporation, New Taipei (TW)

( * ) Notice: Subject to any disclaimer, the term of this patent is extended or adjusted under 35 U.S.C. 154(b) by 0 days.

(21) Appl. No.: 17/037,623

(22) Filed: Sep. 29, 2020

(30) Foreign Application Priority Data

Aug. 18, 2020 (TW) .................................. 109128129

(51) Int. Cl.
*H04N 7/14* (2006.01)
*H04W 76/14* (2018.01)
*H04N 7/15* (2006.01)

(52) U.S. Cl.
CPC ............ *H04W 76/14* (2018.02); *H04N 7/155* (2013.01)

(58) Field of Classification Search
CPC ...................................................... H04N 7/14
See application file for complete search history.

(56) References Cited

U.S. PATENT DOCUMENTS 8,006,023 B1 * 8/2011 Pan ....................... G06F 13/385
710/313
8,451,910 B1 5/2013 Lohier et al.

2007/0058031 A1 * 3/2007 Aizawa .................... H04B 7/26
348/14.01
2008/0250173 A1 10/2008 Ueda
2017/0214807 A1 7/2017 Pring

FOREIGN PATENT DOCUMENTS

EP 2118759 A2 11/2009
WO 2019135603 A1 7/2019

OTHER PUBLICATIONS

Search Report of corresponding European patent application No. 20201632.5 dated Mar. 25, 2021.
Office Action of corresponding Taiwan patent application No. 109128129 dated Oct. 28, 2021.

* cited by examiner

*Primary Examiner* — Olisa Anwah
(74) *Attorney, Agent, or Firm* — Idea Intellectual Limited; Margaret A. Burke; Sam T. Yip

(57) ABSTRACT

An audio-visual transmission device connected with a camera and a receiver is provided and includes a wireless module, a processor and a universal serial bus (USB) port. The wireless module is used for wireless connection with the camera to receive an audio-visual data transmitted from the camera. The processor transmits a connection request signal to the camera through the wireless module. The universal serial bus (USB) port is used for transmitting the audio-visual data. The camera transmits a connection acknowledgment signal and the audio-visual data back to the processor via the wireless module according to the connection request signal, and the receiver is connected to the audio-visual transmission device through the USB port to receive the audio-visual data.

9 Claims, 4 Drawing Sheets

AUDIO-VISUAL TRANSMISSION DEVICE

BACKGROUND OF THE INVENTION

1. Field of the Invention

The present invention relates to an audio-visual transmission device, and particularly to an audio-visual transmission device using a universal serial bus port and wireless transmission.

2. The Prior Arts

In usual video conferences, there are a plurality of users using real time video connection and voice communication through cameras of electronic devices such as computer, smartphone, tablet, and other electronic devices with specific instant messaging applications.

However, audio-visual communication of this type still requires installing, executing or setting specific communication software and/or corresponding camera driver. In addition, most video communication software uses cameras connected to electronic devices, and cannot use cameras on the Internet or a wireless camera. Therefore, it is generally necessary to install a virtual device or driver. In this way, it will be limited by the compatibility between software and hardware; in addition, a specific camera will be required.

Therefore, it is necessary to propose a more convenient and fast audio-visual transmission device to implement a more immediate and easier way to share audio-visual.

SUMMARY OF THE INVENTION

In order to effectively solve the above problems, the present invention provides an audio-visual transmission device used in an audio-visual transmission system which includes a camera and a receiver. The camera generates and transmits an audio-visual data. The audio-visual transmission device wirelessly connected with the camera includes: a wireless module, a processor and a universal serial bus (USB) port. The wireless module is used for wirelessly connecting the camera to receive the audio-visual data. The processor transmits a connection request signal to the camera through the wireless module and coupled to an audio-visual processing module which converts an audio-visual format of the audio-visual data to generate an audio-visual processing data. The universal serial bus (USB) port is used for transmitting the audio-visual processing data. The camera transmits a connection acknowledgment signal and the audio-visual data back to the processor via the wireless module according to the connection request signal, and the receiver is connected to the audio-visual transmission device through the USB port to receive the audio-visual processing data.

According to an embodiment of the present invention, the audio-visual transmission device further includes an audio-visual processing module coupled to the processor and receiving the audio-visual data from the processor and converting an audio-visual format of the audio-visual data to generate and return an audio-visual processing data to the processor.

According to an embodiment of the present invention, the wireless module and the camera are wirelessly connected by WiFi protocol.

According to an embodiment of the present invention, the audio-visual transmission device converts the connection acknowledgment signal received into a format conforming to USB video class to allow the audio-visual processing data to be transmitted through the USB port.

According to an embodiment of the present invention, the audio-visual transmission device further includes a memory unit for storing the audio-visual data.

The audio-visual transmission device of the present invention can effectively improve the prior art. When the audio-visual transmission device of the present invention is coupled to the camera, since the UVC driver is a generic driver preinstalled in most operating systems, the audio-visual transmission device or the camera do not need to install, execute or set a specific driver to receive the audio-visual data of the connected camera on the required receiver. Thus problematic driver compatibility and usage difficulty can be reduced and convenience can be improved. The audio-visual transmission device actually used is also compatible with all operating systems and hardware platforms. Users can flexibly transmit content from various devices and media devices through any camera, and the audio-visual transmission device can automatically adjust the resolution setting to match the resolution of the receiver, and the format of the displayed image will be set as required.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1A:
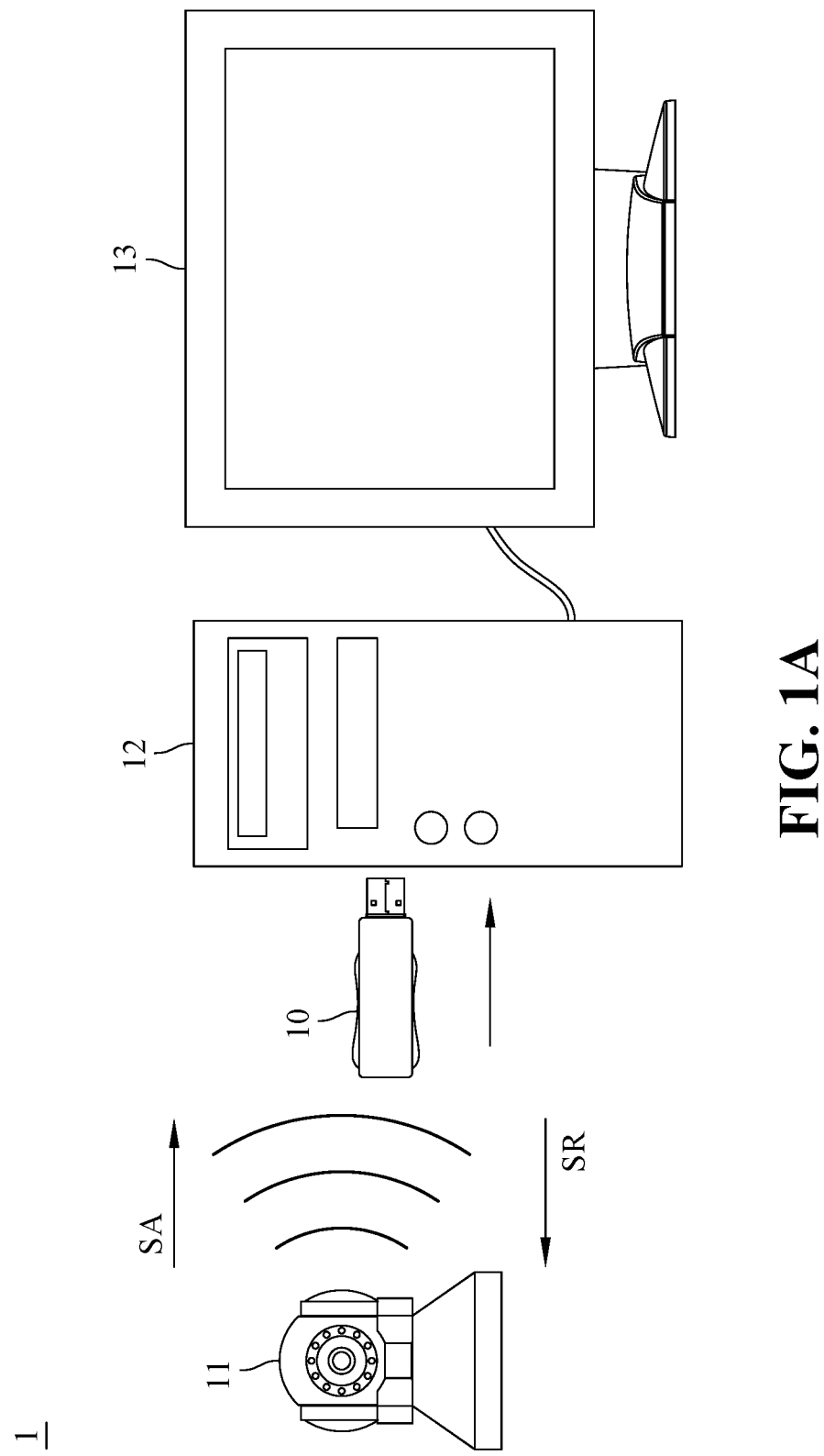
FIG. 1A illustrates a diagram of an audio-visual transmission system according to an embodiment of the present invention.
Figure 1B:
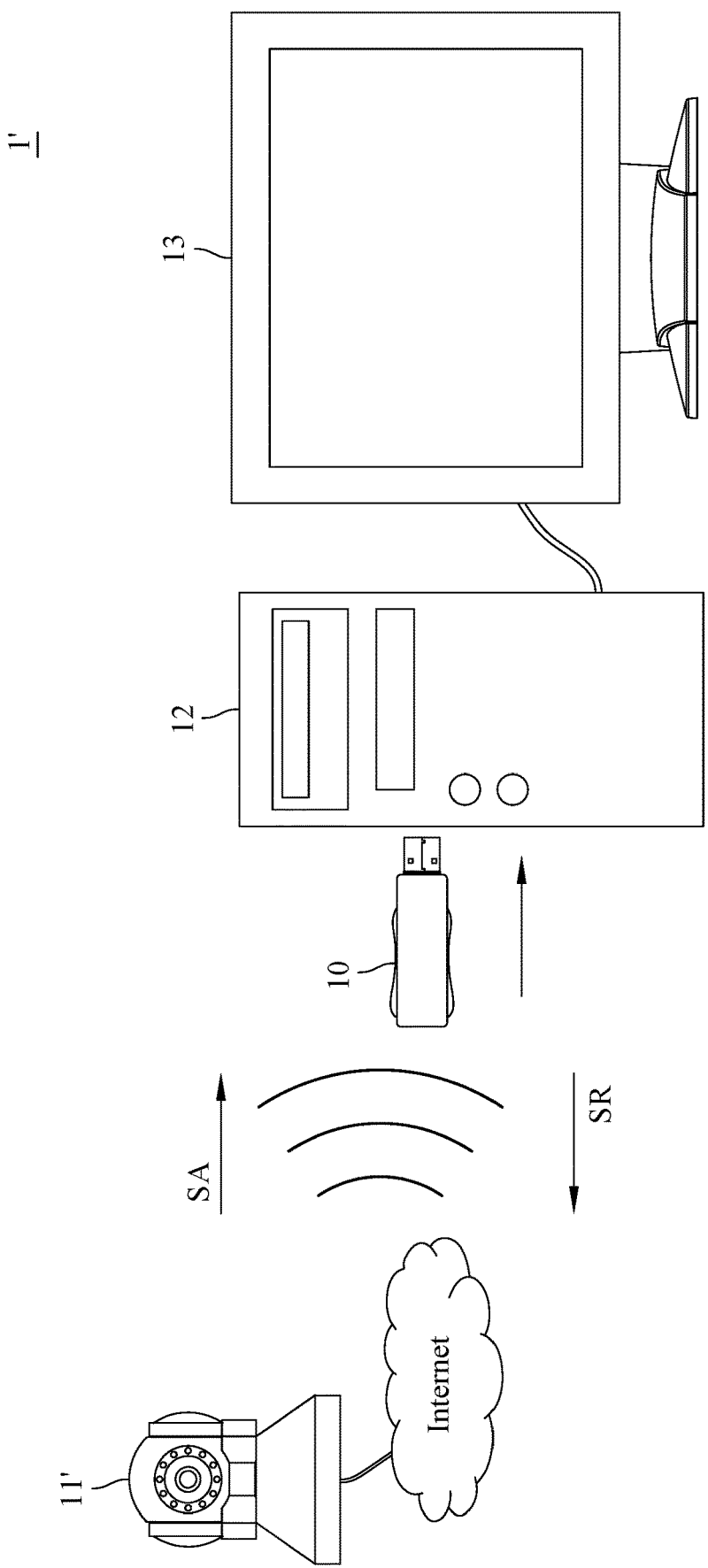
FIG. 1B illustrates a diagram of an audio-visual transmission system according to another embodiment of the present invention.
Figure 2A:
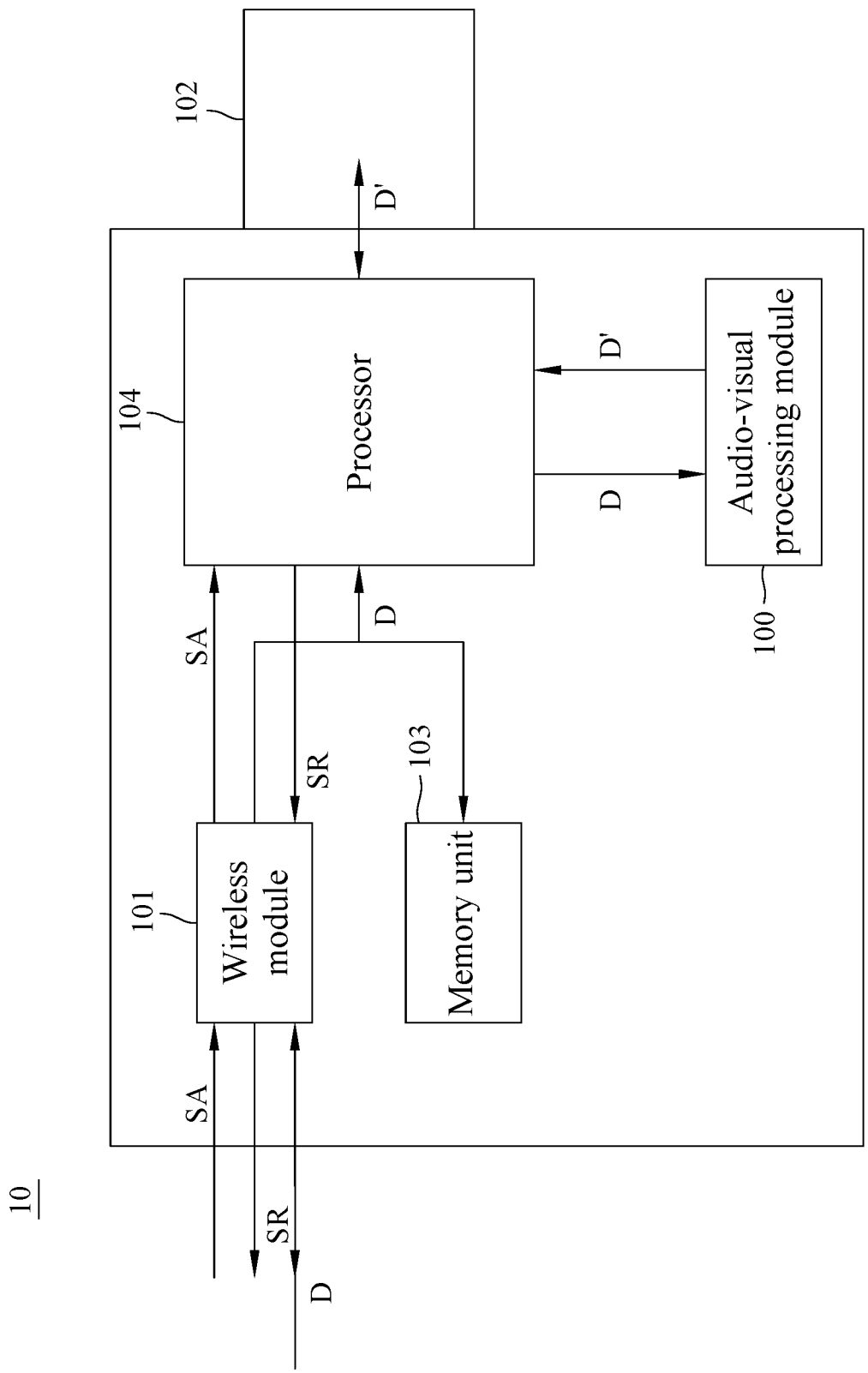
FIG. 2A illustrates a block diagram of an audio-visual transmission device according to an embodiment of the present invention.

Please refer to FIG. 1A and FIG. 2A, FIG. 1A illustrates a diagram of an audio-visual transmission system according to an embodiment of the present invention. FIG. 2A illustrates a block diagram of an audio-visual transmission device according to an embodiment of the present invention. The present invention provides an audio-visual transmission system 1 which includes a camera 11, an audio-visual transmission device 10 and a receiver 12. The camera 11 generates and transmits an audio-visual data D. The audio-visual transmission device 10 is coupled between a camera 11 and a receiver 12. It should be noted that in the following embodiment, the camera 11 of the present invention is a wireless device, and the audio-visual data practically required in the embodiment is not only from the camera 11, but also other sources on the Internet, such as audio-visual players, etc. That is, the camera 11 can be a web cam or a camera with a wireless module. If the camera is a web cam, such as the camera 11' in the embodiment of FIG. 1B, the audio-visual transmission device 10 of the audio-visual transmission system 1' is connected to the camera 11' by the Internet through a wireless module, which is different from the camera 11 with a wireless module in the audio-visual transmission system 1 in FIG. 1A, which can be directly connected in a WiFi direct manner.

The audio-visual transmission device 10 is wirelessly connected with the camera 11 and includes a wireless module 101, an audio-visual processing module 100, a processor 104, and a universal serial bus (USB) port 102. The wireless module 101 is used for wirelessly connecting the camera 11 to receive the audio-visual data D. The audio-visual processing module 100 is coupled to the processor 104 and receives the audio-visual data D and converting an audio-visual format of the audio-visual data D to generate and return an audio-visual processing data D' to the processor 104. The USB port 102 is used for transmitting the audio-visual processing data D'. The receiver 12 is connected to the audio-visual transmission device 10 through the USB port 102 to receive the audio-visual processing data D'. It should be noted that the audio-visual processing module 100 in other embodiments may not be limited to software or hardware form, and may be a software program or a combination of hardware and software run by the processor 104.

In this embodiment, the audio-visual transmission device 10 is connected between the camera 11 and the receiving device 12, and is wirelessly connected to the camera 11 through the wireless module 101. WiFi protocol is preferably used for connection here, but the invention is not limited to this. The processor 104 of the audio-visual transmission device 10 transmits a connection request signal SR to the camera 11 through the wireless module 101, and the camera 11 transmits a connection permission signal SA through the wireless module 101 according to the connection request signal SR back to the processor 104 of the audio-visual transmission device 10. In addition, the audio-visual transmission device 10 may also include a memory unit 103 for storing the audio-visual data D and the connection request signal SR. The connection request signal SR is provided by the audio-visual processing module 100 to the wireless module 101 for transmission. The audio-visual processing module 100 converts the audio-visual format of the audio-visual data D to generate the audio-visual processing data D'.

For example, when the audio-visual transmission device 10 is coupled to the camera 11 through the wireless module 101, the audio-visual transmission device 10 transmits a connection request signal SR to the camera 11 through the wireless module 101, and the camera 11 recognizes the audio-visual transmission device 10 according to the connection request signal SR transmitted by the audio-visual transmission device 10 through the wireless module 101.

Figure 2B:
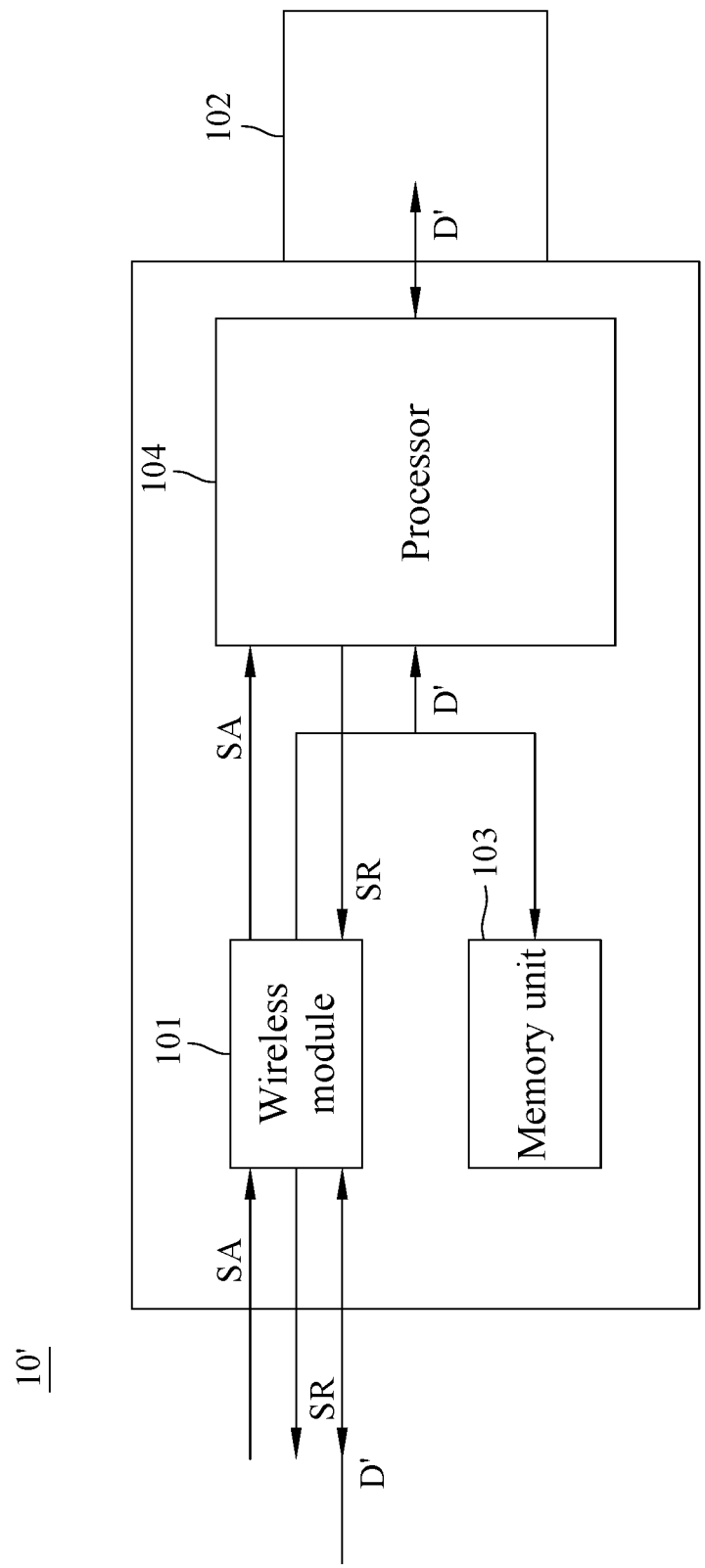
FIG. 2B illustrates a block diagram of an audio-visual transmission device according to another embodiment of the present invention.

In this embodiment, the audio-visual processing module 100 includes a processing unit for receiving and converting the audio-visual data D into the audio-visual processing data D', and the audio-visual transmission device 10 converts the received connection permission signal SA into a format conforming to the USB video class (UVC), so that the universal serial bus 102 transmits the audio-visual processing data D'. In addition, the audio-visual processing module 100 performs revolution conversion to the audio-visual data D transmitted by the camera 11 to the audio-visual transmission device 10 to be the audio-visual processing data D'. It should be noted that, in an embodiment, for example, when the camera 11 is directly connected to the audio-visual transmission device 10 through WiFi direct, as shown in FIG. 1A, the wireless module of the camera will send the audio-visual processing data D' converted from the audio-visual data D to the audio-visual transmission device 10. The audio-visual transmission device 10 then sends the audio-visual processing data D' in the UVC format to the receiver 12. Meanwhile, the audio-visual processing module 100 is not required to perform the format conversion to the audio-visual data D to generate the audio-visual processing data D', so that an audio-visual transmission device 10' of FIG. 2B can be used to replace the audio-visual transmission device 10 of FIG. 2A. On the other hand, when the camera 11 is directly connected to the audio-visual transmission device 10 via WiFi direct, as shown in FIG. 1A, if the audio-visual format is not a UVC format acceptable to the camera 11, such as streaming of real time streaming Protocol (RTSP), during the transmission between the camera 11 and the receiving device 12, the audio-visual processing module 100 is required to perform format conversion. In another embodiment, for example, when the camera 11 is connected to the audio-visual transmission device 10 via the network, as shown in FIG. 1B, if the output of the camera 11' can conform to the UVC format required by the receiving device 12, the most common technology is the motion joint photographic experts group (MJPEG) format, the wireless module 101 of the camera 11' will convert the audio-visual data D into the audio-visual processing data D' and send the audio-visual processing data D to the audio-visual transmission device 10 and then the audio-visual transmission device 10 sends the audio-visual processing data D' in the UVC format to the receiver 12. Meanwhile, the audio-visual processing module 100 does not need to perform format conversion, so that the audio-visual transmission device 10' in FIG. 2B can be used to replace the audio-visual transmission device 10 of FIG. 2A. In contrast, when the camera 11 is connected to the audio-visual transmission device 10 via the network, as shown in FIG. 1B, if the output of the camera 11 cannot conform to the UVC format required by the receiving device 12, such as the RTSP streaming, the transmission between the camera 11 and the receiver 12 will require the wireless module 101 to perform conversion. In addition, in other embodiments, the receiver 12 and the display device 13 may be an integrated device with a display function, such as a mobile phone, a tablet, a notebook or any portable device.

For example, when the camera 11 recognizes the audio-visual transmission device 10 through the wireless module 101, the camera 11 provides the audio-visual data D to the audio-visual transmission device 10 through the wireless module 101. Then the audio-visual processing module 100 processes the audio-visual data D received by the audio-visual transmission device 10 through the wireless module 101, and then provides the audio-visual processing data D' to the receiver 12 for display or projection. If the audio-visual data D output from the camera 11 to the audio-visual transmission device 10 through the wireless module 101 has a first resolution (for example, 1080p), and the audio-visual processing data D' output from the audio-visual processing module 100 to the receiving device 12 has a second resolution (for example, 720p). When the audio-visual transmission device 10 receives the audio-visual data D with the first resolution from the camera 11 through the wireless module 101, the audio-visual transmission device 10 wirelessly outputs and sends the audio-visual data D with the first resolution through the wireless module 101 to the audio-visual processing module 100. When the audio-visual processing module 100 receives the audio-visual data D with the first resolution transmitted from the audio-visual transmission device 10 through the wireless module 101, the audio-visual processing module 100 will perform image processing to the audio-visual data D, such as scaling, to convert the audio-visual data D from the first resolution to the second resolution, and then the audio-visual processing module 100 outputs the audio-visual processing data D' with the second resolution to the receiver 12. It should be noted that the second resolution may be greater than the first resolution depending on actual requirements, for example, the second resolution is 4Kp, which is greater than 1080p of the first resolution.

In an embodiment, the audio-visual processing module 100 includes a plurality of processing units for receiving audio-visual data D and converting the audio-visual data D into the audio-visual processing data D'. The USB port 102 is coupled to the plurality of processing units for transmitting the audio-visual processing data D' to the receiver 12. In other embodiments, the audio-visual processing data D' can be Internet Protocol (IP) packets, so that wireless transmission can also be performed.

In an embodiment, the receiver 12 has a control unit to convert the audio-visual processing data D' back to the audio-visual data D for the receiver 12 to display or project.

The format supported by the USB port 102 can be USB 2.0 or USB 3.0, but the present invention is not limited to this.

When used in a video conference, the audio-visual transmission device 10 is coupled to the camera 11 through the wireless module 101, which can be a camera, a mobile phone, a tablet, a notebook or a lens on any portable device, and the audio-visual transmission device 10 is coupled to the receiver 12, and the display device 13 may be a computer screen or a projector for display. The audio-visual transmission device 10 of the present invention is coupled to the camera 11 through the wireless module 101, and the audio-visual processing module 100 of the audio-visual transmission device 10 can be coupled to the receiver 12 through a USB connector or a USB cable.

After the notebook in the video conference recognizes the audio-visual transmission device 10 according to the connection request signal SR transmitted by the audio-visual transmission device 10 through the wireless module 101, the audio-visual transmission device 10 can receive and transmit the audio-visual data D sent by the notebook through the wireless module 101 to the audio-visual processing module 100 for processing. Then, the audio-visual processing module 100 sends the audio-visual processing data D' to the receiver 12 for display or projection.

Compared with the prior art, the audio-visual transmission device and system of the present invention can effectively improve the prior art. When the audio-visual transmission device of the present invention is coupled to the camera, the audio-visual transmission device will only send a connection request signal to the camera, so that the camera can recognize the audio-visual transmission device and send the audio-visual data to the audio-visual transmission device, since the UVC driver is a generic driver preinstalled in most operating systems, neither the audio-visual transmission device nor the camera need to install, execute or set a specific driver to receive the audio-visual data of the connected camera on the required receiver. Thus problematic driver compatibility and usage difficulty can be reduced and convenience can be improved. In practice, users can flexibly transmit content from various devices and media devices through any camera, and the audio-visual transmission device can automatically adjust the resolution setting to match the resolution of the receiver, and the format of the displayed image will be set as required.

The present invention is not limited to the above-mentioned embodiments. It is obvious to those skilled in the art that various modifications and variations can be made to the present invention without departing from the spirit or scope of the present invention.

Therefore, the present invention is intended to cover the modifications and variations made to the present invention or falling within the scope of the attached claims and equivalent scope thereof.

What is claimed is:

1. An audio-visual transmission device connected with a camera and a receiver, and at least comprising:
   a wireless module for wirelessly connecting the camera to receive an audio-visual data transmitted from the camera, if an output of the camera conforms to a UVC format required by the receiver, the wireless module will convert the audio-visual data into an audio-visual processing data;
   a processor transmitting a connection request signal to the camera through the wireless module;
   an audio-visual processing module coupled to the processor and receiving the audio-visual data and converting an audio-visual format of the audio-visual data to generate and return the audio-visual processing data to the processor, if the audio-visual format is not a UVC format acceptable to the camera, the audio-visual processing module is required to perform a format conversion; and
   a universal serial bus (USB) port for transmitting the audio-visual processing data;
   wherein the camera transmits a connection acknowledgment signal and the audio-visual data back to the processor via the wireless module according to the connection request signal, and the receiver is connected to the audio-visual transmission device through the USB port to receive the audio-visual processing data.

2. The audio-visual transmission device according to claim 1, wherein the wireless module and the camera are wirelessly connected by WiFi protocol.

3. The audio-visual transmission device according to claim 1, wherein the audio-visual transmission device converts the received connection acknowledgment signal into a format conforming to USB video class to allow the audio-visual processing data to be transmitted through the USB port.

4. The audio-visual transmission device according to claim 1, wherein the audio-visual transmission device further includes a memory unit for storing the audio-visual data.

5. An audio-visual transmission device connected with a camera and a receiver, and at least comprising:
   a wireless module for wirelessly connecting the camera to receive an audio-visual data transmitted from the camera, if an output of the camera conforms to a UVC format required by the receiver, the wireless module will convert the audio-visual data into an audio-visual processing data;
   a processor transmitting a connection request signal to the camera through the wireless module; and
   a universal serial bus (USB) port for transmitting the audio-visual data;
   wherein the camera transmits a connection acknowledgement signal and the audio-visual data back to the processor via the wireless module according to the connection request signal, and the receiver is connected to the audio-visual transmission device through the USB port to receive the audio-visual data.

6. The audio-visual transmission device according to claim 5, further comprising an audio-visual processing module coupled to the processor and receiving the audio-visual data from the processor and converting an audio-visual format of the audio-visual data to generate and return an audio-visual processing data to the processor.

7. The audio-visual transmission device according to claim 5, wherein the wireless module and the camera are wirelessly connected by WiFi protocol.

8. The audio-visual transmission device according to claim 5, wherein the audio-visual transmission device converts the received connection acknowledgement signal into a format conforming to USB video class to allow the audio-visual processing data to be transmitted through the USB port.

9. The audio-visual transmission device according to claim 5, further comprising a memory unit for storing the audio-visual data.

* * * * *